(12) United States Patent
Chapweske et al.

(10) Patent No.: US 7,701,884 B2
(45) Date of Patent: Apr. 20, 2010

(54) NETWORK COMMUNICATIONS BANDWIDTH CONTROL

(75) Inventors: Adam Chapweske, Chicago, IL (US); Jon N. Swanson, Queensbury, NY (US)

(73) Assignee: Insors Integrated Communications, Chicago, IL (US)

( * ) Notice: Subject to any disclaimer, the term of this patent is extended or adjusted under 35 U.S.C. 154(b) by 1552 days.

(21) Appl. No.: 10/993,268

(22) Filed: Nov. 19, 2004

(65) Prior Publication Data

US 2005/0232151 A1    Oct. 20, 2005

Related U.S. Application Data

(60) Provisional application No. 60/563,627, filed on Apr. 19, 2004.

(51) Int. Cl.
*H04L 12/16* (2006.01)
(52) U.S. Cl. .................................... 370/260; 370/235
(58) Field of Classification Search ............... 370/229, 370/231, 232, 235, 235.1, 236, 253, 260, 370/389, 412, 401, 402, 428, 230, 261, 262, 370/263, 358, 265, 270, 252
See application file for complete search history.

(56) References Cited

U.S. PATENT DOCUMENTS

| | | | |
|---|---|---|---|
| 5,400,329 A * | 3/1995 | Tokura et al. ............... 370/232 |
| 5,793,415 A | 8/1998 | Gregory, III et al. |
| 5,805,228 A | 9/1998 | Proctor et al. |
| 5,831,678 A | 11/1998 | Proctor |
| 5,864,681 A | 1/1999 | Proctor et al. |
| 5,867,494 A | 2/1999 | Krishnaswamy et al. |
| 5,867,502 A | 2/1999 | Chang |
| 5,909,250 A | 6/1999 | Hardiman |
| 5,926,226 A | 7/1999 | Proctor et al. |
| 5,991,268 A * | 11/1999 | Awdeh et al. ............ 370/236.1 |
| 5,999,525 A | 12/1999 | Krishnaswamy et al. |
| 6,072,830 A | 6/2000 | Proctor et al. |
| 6,134,222 A | 10/2000 | Rogers et al. |
| 6,219,339 B1 * | 4/2001 | Doshi et al. .................. 370/235 |
| 6,272,127 B1 | 8/2001 | Golden et al. |
| 6,335,927 B1 | 1/2002 | Elliott et al. |
| 6,426,945 B1 | 7/2002 | Sengodan |
| 6,445,681 B1 * | 9/2002 | Pogrebinsky ............... 370/252 |
| 6,452,924 B1 | 9/2002 | Golden et al. |

(Continued)

OTHER PUBLICATIONS

SanKu Jo, Pierce E. Cantrell, "A Dynamic QoS Control Scheme for Videoconferencing in a Heterogeneous Internet," Internet Society INET 99 (1999).

(Continued)

*Primary Examiner*—Brenda Pham
(74) *Attorney, Agent, or Firm*—Greer, Burns & Crain, Ltd.

(57) ABSTRACT

A method for controlling real time data communications over a packet based network comprises steps of dynamically measuring data packet loss between a receiver and a sender on the network, dynamically measuring data latency between the sender and receiver, and comparing the dynamically measured data packet loss to a loss limit and comparing the dynamically measured data latency to a latency limit. If one or both of the loss limit or the latency limit is exceeded, then the method may include reducing the rate of data transmission from the sender.

34 Claims, 3 Drawing Sheets

U.S. PATENT DOCUMENTS

| | | | |
|---|---|---|---|
| 6,490,275 B1 | 12/2002 | Sengodan | |
| 6,611,872 B1 | 8/2003 | McCanne | |
| 6,677,979 B1 | 1/2004 | Westfield | |
| 6,680,745 B2 | 1/2004 | Center, Jr. et al. | |
| 6,731,625 B1 | 5/2004 | Eastep et al. | |
| 6,754,181 B1 | 6/2004 | Elliott et al. | |
| 6,775,247 B1 | 8/2004 | Shaffer et al. | |
| 7,042,841 B2 * | 5/2006 | Abdelilah et al. | 370/229 |
| 7,085,268 B2 * | 8/2006 | Fukuda et al. | 370/389 |
| 7,142,251 B2 | 11/2006 | Sha et al. | |
| 7,151,762 B1 | 12/2006 | Ho et al. | |
| 7,193,996 B2 | 3/2007 | Dobbins et al. | |
| 7,225,459 B2 | 5/2007 | Magliaro | |
| 7,385,940 B1 | 6/2008 | Harrow et al. | |
| 2004/0071084 A1 * | 4/2004 | El-Hennawey et al. | 370/230 |
| 2004/0111472 A1 | 6/2004 | Swanson et al. | |
| 2004/0117446 A1 | 6/2004 | Swanson | |
| 2004/0236593 A1 | 11/2004 | Swanson et al. | |
| 2004/0249967 A1 | 12/2004 | Swanson | |
| 2005/0094455 A1 | 5/2005 | Wu | |
| 2005/0232151 A1 | 10/2005 | Chapweske et al. | |
| 2005/0237377 A1 | 10/2005 | Chapweske et al. | |
| 2008/0170616 A1 | 7/2008 | Hwang et al. | |

OTHER PUBLICATIONS

ICIA/InfoComm, "Polycom® & Packeteer® enhance IP videoconferencing," published on the world wide web circa Apr. 2003.

Chris Foley, "Dynamic Bandwidth Throttling," A Technical White Paper, XcelleNet, Inc. believed published on the worldwide web Oct. 2002.

Microsoft Corporation, "How Bandwidth Throttling Works in IIS 4.0," published on the world wide web circa 2003.

Microsoft Corporation, Chapter 7: Network Bandwidth Considerations, published on the world wide web circa Dec. 1999.

Andy Volk, "Video Compression: A Codec Primer," published on the worldwide web at: http://webmonkey.wired.com/webmonkey/04/42/index4a.html, Oct. 22, 2004.

Wave Report, "Video Compression Tutorial," published on the worldwide web at: http://www.wave-report.com/tutorials/VC.htm, May 30, 2005.

Berkeley Design Technology, Inc., "Smart Processor Picks for Consumer Media Applications, Introduction to Video Compression," Embedded Systems Conference, Apr. 2004, p. 1-22.

* cited by examiner

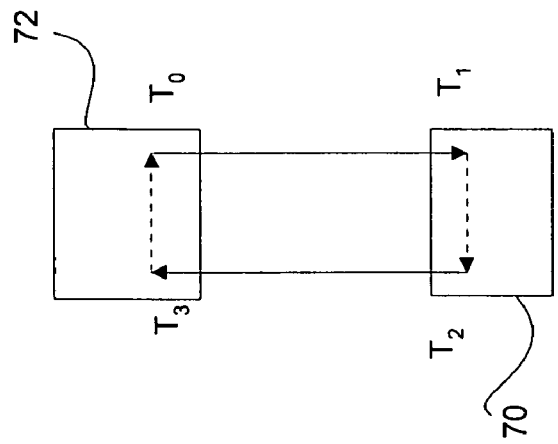
FIG. 5
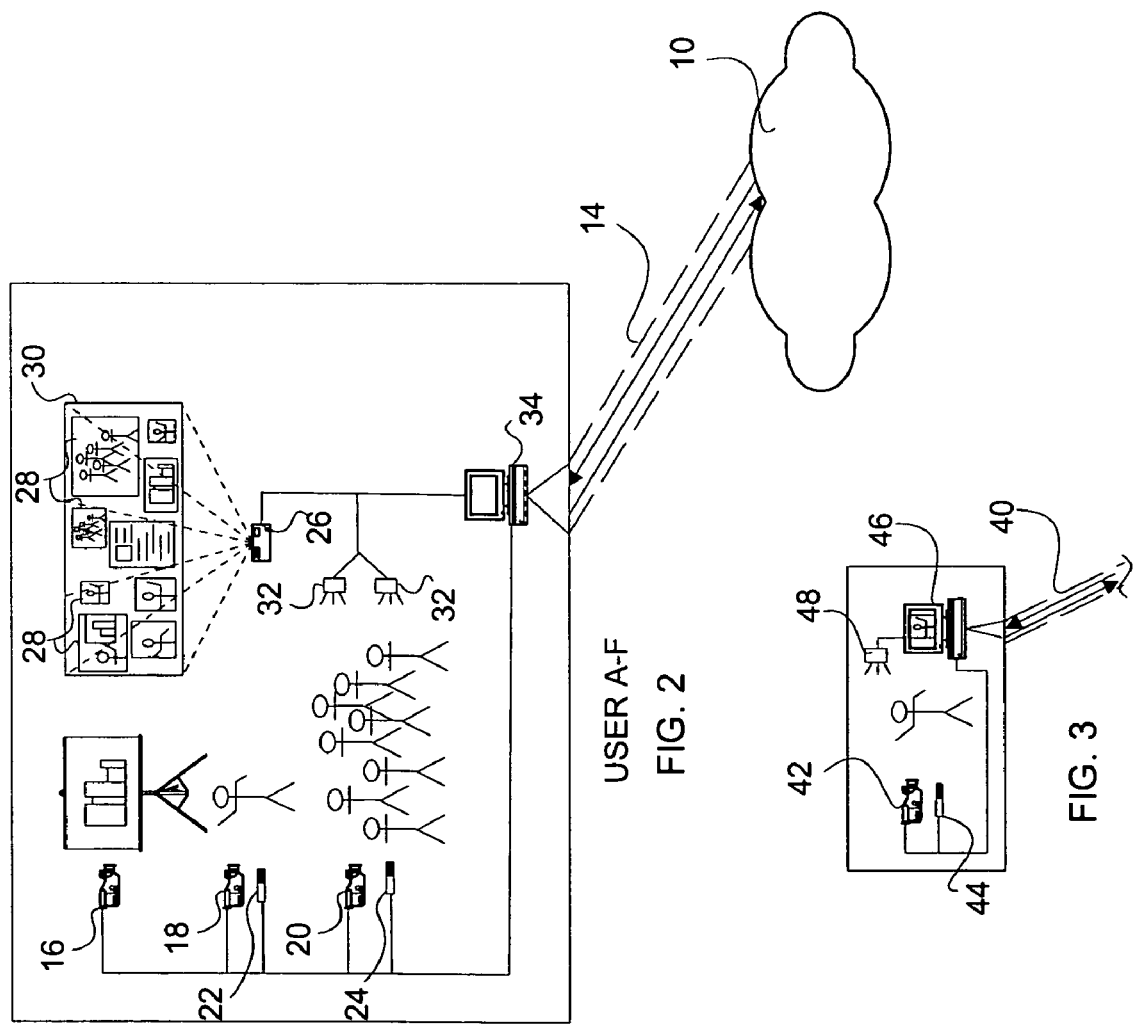

NETWORK COMMUNICATIONS BANDWIDTH CONTROL

CROSS REFERENCE

The present application claims priority on U.S. Provisional Application No. 60/563,627 filed on Apr. 19, 2004.

BACKGROUND

Communication over data networks has become commonplace. Examples of such communications include the use of packet-based digital data to communicate audio and video data in real-time over a data network. Voice and video data sharing, for example, can occur in real time over a data network between two or more users during a streaming videoconference or other virtual meeting.

Required bandwidth to transport the data can be considerable. Taking video conferencing as one example application, multiple participants may be streaming voice, video, and application data with each of the other participants in real time. Each participant may receive all data streams from all other participants. Each participant may be connected to the conference by a network connection that has a different bandwidth capacity from all other connections. Further, other data traffic is often being carried over the network connections that may be unrelated to the videoconference. In some circumstances, the bandwidth capacity on a particular network connection may be saturated or exceeded, and data loss may occur in the conference or other traffic streams.

Solutions have been proposed to avoid this undesirable result. For example, one proposed solution to this problem is to test the network connection(s) prior to an event such as a videoconference to determine available bandwidth, and to predict the required amount of bandwidth for the event. Assuming sufficient capacity exists, the required capacity is then pre-allocated on the network, and each application is configured to transmit no more than the allocated amount.

Success using this method, however, has been limited at best. One significant limitation of this method is that the predicted bandwidth load and the measured bandwidth capacity tend to be static and reflect only one point in time. The actual bandwidth consumed and available, on the other hand, is typically dynamic (varies with time). This is particularly true when communicating over shared network connections where other traffic exists. Also, predicting bandwidth load and measuring network capacity requires pre-event efforts and knowledge that add to the complexity and inaccuracy of this method. Accuracy of the prediction is dependent on a variety of difficult to predict factors. Further, on a shared data network connection (as opposed to dedicated connections) a fixed allocation of bandwidth can require unreasonable overhead in network administration as well as wasted bandwidth.

Another proposed solution has been to make use of real time data communication protocol tools to adjust transmission rates. One protocol used for communicating real time data is Real Time Protocol ("RTP") and its real time control protocol ("RTCP"). Another proposed solution is to use RTP's control protocol (RTCP) to adjust the transmission rate based feedback from the receiver. One problem using this method is determining when and what value to set the rate. A common technique is to estimate the rate at which TCP-based applications on the same network would use, and use an equal amount of bandwidth. However, this method allows the applications to exceed network capacity, which results in packet loss. This is undesirable since some UDP-based applications (e.g., real-time audio) tolerate loss very poorly.

Known methods have also proven inadequate in using the obtained feedback to accurately predict network congestion. These methods also rely on feedback data obtained using RTCP ports and assume that this data is consistent with the RTP ports. This assumption often fails. This proposed method can also be inadequate in applications such as multi-point videoconferences since decisions are made only at the origination point. This often fails to accurately account for or respond to environments where multiple paths between a sender and multiple receivers exist.

Also, previous proposed solutions to bandwidth control have been almost exclusively designed for point-to-point connections (e.g., unicast). These solutions become less successful and/or impractical in multi-point environments (e.g., multicast, multi-unicast). For example, known methods have proven inadequate in videoconference environments where each participant is receiving multiple data streams from multiple sources.

SUMMARY OF THE INVENTION

One example method for throttling or controlling real time data communications over a packet based network comprises the steps of dynamically measuring data packet loss between a receiver and a sender on the network, dynamically measuring data latency between the sender and receiver, comparing the dynamically measured data packet loss to a loss limit, and comparing the dynamically measured data latency to a latency limit. If one or both of the loss limit or the latency limit is exceeded, the method further includes the step of reducing the rate of data transmission from the sender.

BRIEF DESCRIPTION OF THE DRAWINGS

FIG. 2 is a schematic of a user of the network of FIG. 1;

FIG. 3 is a schematic of an alternate user of the network of FIG. 1;

FIG. 5 is a schematic useful to illustrate an exemplary step of a method of the invention.

DETAILED DESCRIPTION OF INVENTION EMBODIMENTS

Before discussing exemplary embodiments of the invention in detail, it will be appreciated that the invention may be embodied in a method, a system, and/or in a computer program product. For example, a method of the invention may be carried out by one or more users using computers, and a program product of the invention may include computer executable instructions that when executed by one or more computers cause one or more computers to carry out a method of the invention. Further, one or more computer(s) that contains a program product of the invention may embody a system of the invention. It will accordingly be appreciated that in describing a particular embodiment of the present invention, description of other embodiments may also be made. For example, it will be understood that when describing a method of the invention, a system and/or a program product of the invention may likewise be described.

Figure 1:
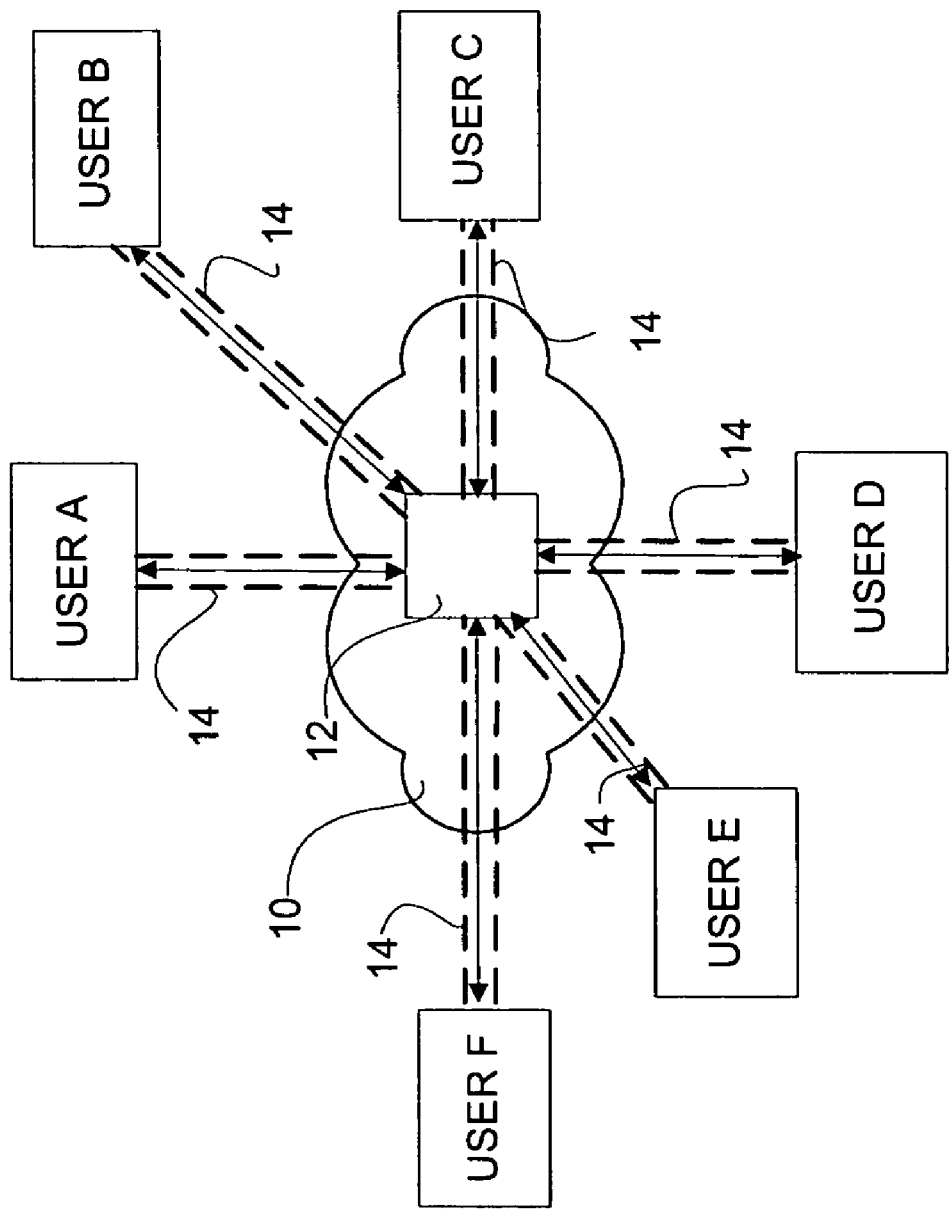
FIG. 1 is a schematic of a data network configuration useful for illustrating methods and program products of the invention.

Turning now to the drawings, FIG. 1 is a schematic of a network that is useful to describe exemplary embodiments of the invention. The network shown as a "cloud" 10 includes an interface 12 that links users A-F to one another. The term "interface" as used herein is intended to be broadly interpreted as comprising one or more components for linking communications between users. It may include, for example, one or more computers having a plurality of communication ports, a software component running on one or more computers that facilitate communications, a networking card(s), a modem(s), and the like. Those skilled in the art will appreciate that as used herein the term port is intended to be broadly interpreted as a physical or logical destination and/or origination point for communications. Examples of ports include but are not limited to, network cards, an IP address, a TCP or UDP port number, and the like.

The interface 12 may be referred to in the videoconferencing, virtual meeting, and similar real-time data streaming and networking applications as a "bridge," which generally comprises a computer or router having a plurality of ports for interconnecting the users A-F. In some videoconference and similar applications, the bridge 12 may be a "repeater" that "repeats" a signal received from one of the users A-F to all other users A-F.

The network 10 may be a digital or analog communications network, with a packet switched protocol network being one example. A particular example includes a plurality of computers electronically linked to one another and communicating data to one another in Internet protocol (IP) format. In IP and other packet based protocols, data may be communicated in discrete packets that are individually addressed. The network 10 may be a land-based physically wired network, or may be a wireless network. Also, the protocol between bridge 12 and the users A-F may be that of a server and clients.

The network 10 may be useful for a number of data communication purposes. In an exemplary application, the network 10, is useful to facilitate a virtual meeting between attendees that are physically present at each of the users A-F. As used herein the term "virtual meeting" is intended to be broadly interpreted as a sharing of real-time communications between participants that are not physically present with one another. One example of a virtual meeting is a videoconference during which video and audio communications are shared in real-time between a plurality of users. As used herein the term "real-time" is intended to broadly refer to a condition of generally corresponding to actual time. For example, data is real-time if it takes about one minute of data playback to describe an event that took about one minute to occur. The real-time data may be recorded and still be real-time.

Communications with each of the users A-F may be carried out on a 2-way basis from the network 10, with data sent to and received from each of the users A-F over the communications lines represented as dashed line links 14. These may comprise physically wired connections such as copper wires, optical fiber cables, or the like; or may be wireless connections. Real-time video, audio, and other data may be sent from each of the users A-F to all others of the users A-F through the bridge 12 and over the communications lines 14.

Those knowledgeable in the art will appreciate that these communications may be carried out in any of a number of generally known procedures. For example, known methods of one or more of uni-, multi-, or broad-cast may be used. Also, the data may be streaming. Each user site may have cameras and microphones, by way of further example, from each of which is streamed a continuous, real-time data stream on a particular multicast address and port number. As used herein the term continuous data stream is intended to broadly refer to a data stream sent in substantially continuous succession, although some degree of intermittency is contemplated. For example, a packetized data stream in IP may be "continuous" even though there may be some delay between packets.

One particular exemplary method for communicating and receiving the continuous data streams within the practice of the invention is according to the so-called "Real-time Transport Protocol" or "RTP." RTP is a widely supported Internet-standard protocol for the transport of real-time data, including audio and video. It can be used for media-on-demand as well as interactive services such as Internet telephony. RTP consists of a data and a control part. The latter is referred to as RTCP. The data part of RTP is a thin protocol providing support for applications with real-time properties such as continuous media (e.g., audio and video), including timing reconstruction, loss detection, security and content identification. RTP data is packetized in separate packets from RTCP control data, and RTP data is typically communicated across "data ports" while RTCP control data is communicated across "control ports." Other protocols likewise utilize separate data and control ports and channels.

Communications of the streaming real-time data between users A-F may be further appreciated through consideration of the schematic of FIG. 2 that shows user A-F in detail. The users A-F may be conference rooms that include multiple individuals that are all participating in the videoconference in some form or fashion. Users A-F include three cameras shown as elements 16, 18 and 20 respectively. These three cameras may be trained on different people or things at the users A-F, with an example being camera 16 at a presentation board, camera 18 at a speaker, and camera 20 at an audience. A first microphone 22 may be provided for recording audio from the speaker and a second microphone 24 for recording audio from the audience. Although not illustrated, other cameras, microphones, computers, gateways, firewalls, multiplexers, co/decoders and like devices may also be present. Also, it will be understood that FIG. 2 is exemplary only, and that a multitude of other configuration are possible for users A-F, which may also include many other devices other than cameras and microphones. FIG. 3 illustrates another exemplary configuration for any of users A-F. In FIG. 3, only a single camera 42 is provide and a single microphone 44. This might be useful, for example for allowing a single individual to participate in a videoconference.

In an exemplary videoconference, each of the users A-F not only sends video and audio data, but likewise receives video, audio, and other data communicated from each of the other users A-F. Referring once again to the schematic of FIG. 2 by way of example, one or more projectors 26 may be provided to project real-time video images 28 from one or more of the other users A-F on a screen 30. Any number of video images may be provided that show video data in real-time from any number of other cameras or other sources located at the other users. For example, the user A may simultaneously display video data streams from each of the other users B-F. Further, the video images displayed may include charts, graphs, documents, other digital files, replayed video files, and the like. One or more speakers 32 may also be provided to play real-time audio from the other users or other sources.

A particular example of a data file in addition to audio and video data includes shared documents having text, images, numerical values, and the like. For example, within a videoconference or virtual meeting different users at different locations may desire to all work on a single document. In such circumstances, continuous updates of the document should be communicated between users.

One or more computers 34 may be provided to receive and send all of the video, audio, documents, digital files and other data at the standard user A. An application program, such as an RTP application, may be running on the computer 34 that provides signal coding/decoding, signal compression/decompression, coordinates receiving and sending of the data streams, and controls some other aspects of sending and receiving of the data streams. For example, the computer 34 may be used to control which or how many video images 28 are displayed on the screen 30, to size the images 28, to set audio levels for the speakers 32, and the like.

In exemplary videoconference and other data communication events, each discrete data stream that is communicated has a unique identifier associated with it. By way of example, methods, program products, and systems of the invention may be practiced across packet switched networks 10 that are configured for carrying discretely packetized data communications, with internet protocol ("IP") communications being one example, and RTP communications being a more specific example. In IP communications, continuous data is packed into discrete packets and provided with a destination address. The address may be a digital string, for instance, that identifies a port on the bridge 12 (FIG. 1). Each of the discrete packets of data may also include a unique identifier, such as a digital origination address.

The origination address may, for instance, be a digital string that identifies the computer 34 at the user A-F from which it originated (FIGS. 2-3). Within RTP protocol, identifier information may be embedded into the header portion of individual packets by the RTP application programs running on the computers 34. For example, a particular data stream may have source identifying information such as an SSRC ("synchronization source" in RTP protocol) and/or another identifier that includes the user name, camera number, and IP address of the computer 34. The SSRC identifier carried in the RTP header and in various fields of RTCP packets is a random 32-bit number that is required to be globally unique within an RTP session.

According to the configurations of FIGS. 1-3, a real-time videoconference or virtual meeting can occur between the users A-F. A rich, immersive, and extensive virtual meeting environment may be provided that includes video, audio, and other streaming data shared in real-time between multiple participants at multiple locations. Participants at each of the users A-F may simultaneously view and hear data from all others of the users A-F. Such meetings may be desirable for corporations, universities, government, and other organizations that have groups of people located remotely from one another that need to interact in a somewhat detailed manner.

It will be appreciated, however, that in conducting such virtual meetings, relatively large amounts of communication bandwidth may be required. Referring to the examples of FIGS. 1 and 2, each of the several cameras and microphones at each of the users A-F is sent as a streaming real-time data stream to each of the other users A-F. By way of illustration, Table 1 summarizes the data communicated between the user A and all other users B-F:

| | Outgoing Data Streams: | Incoming Data Streams: |
|---|---|---|
| User A | A1 (CAM 16) | From CLNT. B: B1-B5 (5 Streams) |
| | A2 (CAM 18) | From CLNT. C: C1-C5 (5 Streams) |
| | A3 (CAM 20) | From CLNT. D: D1-D5 (5 Streams) |
| | A4 (MIC 22) | From CLNT. E: D1-D5 (5 Streams) |

-continued

| Outgoing Data Streams: | Incoming Data Streams: |
|---|---|
| A5 (MIC 24) | From CLNT. F: D1-D5 (5 Streams) |

As a result, in an exemplary meeting occurring according to the configuration of FIGS. 1-2 wherein each of the users A-F are meeting with one another, each user A-F is simultaneously streaming five discrete data streams (three cameras and two microphones) out across the communication line 14 while also simultaneously receiving twenty-five discrete data streams (five from each of the five other users) across the line 14. The bandwidth required for each of the communications lines 14 is therefore substantial. In some exemplary configurations, all of the audio streams from each site may be bundled together for convenience. For example, data streams A4 and A5 (MIC 1 and 2) may be bundled into a single stream.

It will also be appreciated that the schematic of FIG. 1 is simplified, and that in typical practice communication between users A-F over the communications lines 14, network 10, and bridge 12 may be routed through a plurality of computers, routers, buffers, and the like. For instance, each communications line 14 may include multiple routers and buffers between users A-F and the network 10. One advantage of IP protocol communications is that each individual packet of data includes a destination address and may be routed over any of several available paths between origination and destination. Accordingly, each of the communications lines 14 may vary somewhat for different packets—some packets may traverse a different path than other packets between the same source and destination. Further, it will be appreciated that virtual meetings such as videoconferences may include different numbers of users than users A-F illustrated, and may, in fact, include tens, hundreds, or even more users. With larger numbers of users the traffic load across communication lines 14 of course increases.

It will also be appreciated that the network 10 and communications lines 14 may not be dedicated to only the virtual meeting or videoconference taking place, and may not be dedicated to the users A-F and the network 10. Many other users may be sharing each communications line 14 to communicate with the network 10. There may be substantial additional data traffic taking place over the communications line 14 during the videoconference or virtual meeting. This additional traffic may compete with the data streams being communicated between the users A-F for the bandwidth resources available over the communications lines 14. At times, insufficient bandwidth may be available to carry all of the competing traffic over one or more of the lines 14, with the result that some traffic is delayed or lost. This can lead to an unacceptable quality of communications between the users A-F.

Figure 4:
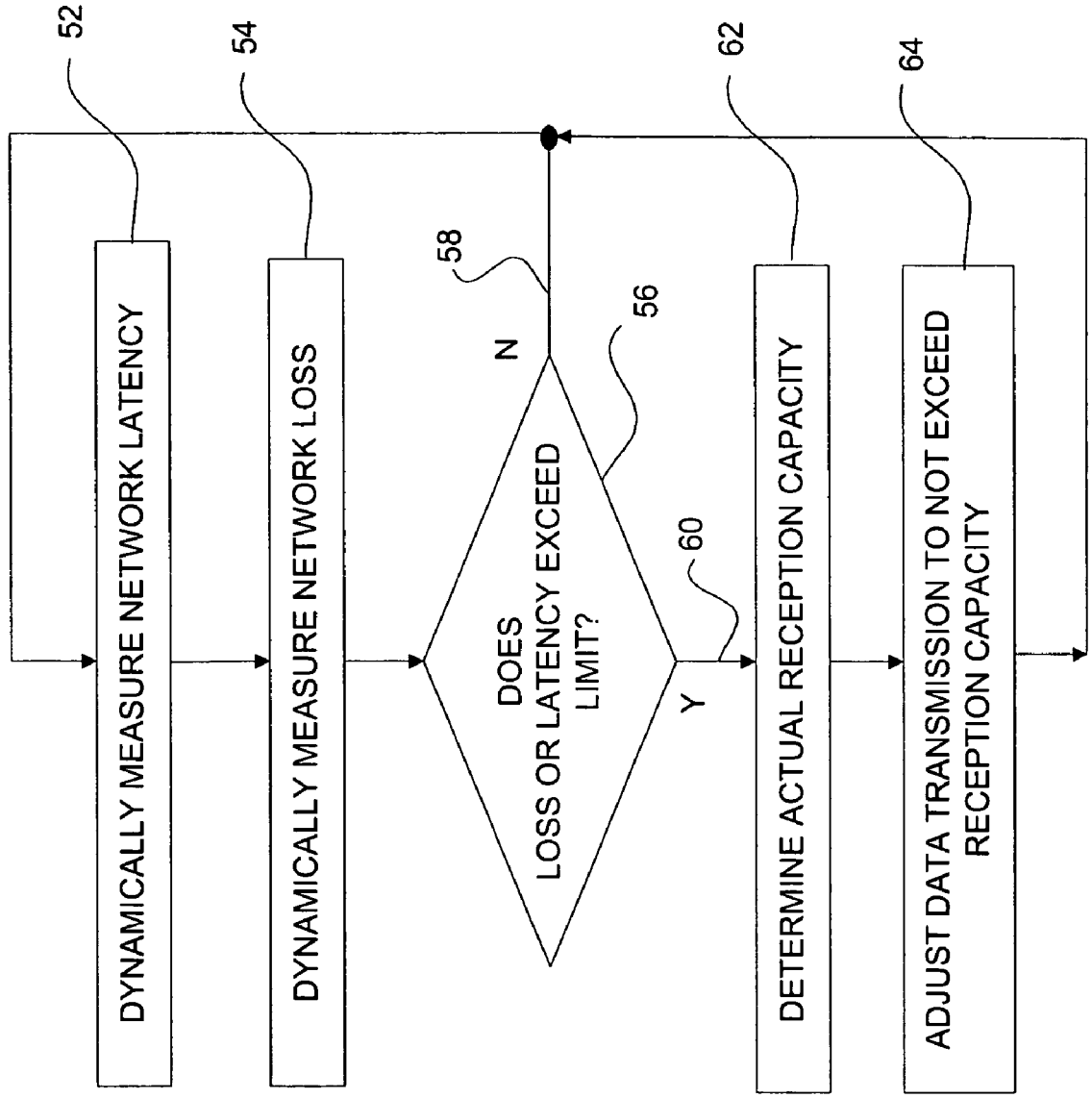
FIG. 4 is a flowchart illustrating one exemplary method of the invention.

Methods of the invention are useful to address these and similar situations in other streaming data communications events. FIG. 4 is a flowchart illustrating one exemplary method of the invention suitable for practice on a network 10 between a sender and a receiver, with an example being between the bridge 12 and any of the users A-F as illustrated by FIG. 1. Referring again to FIG. 4, the exemplary method includes a step of dynamically determining bandwidth capacity between the receiver and the sender on the network by dynamically measuring data latency (block 52) and packet loss (block 54). It will be appreciated that as used herein the term "latency" is to be broadly interpreted as delay. On typical wide area networks, by way of example, data communications between a sender and receiver may experience significant latency due to buffering at routers between the sender and the receiver.

The latency and loss may be measured between any selected locations on the network. When practicing a method of the invention in a videoconference or virtual meeting environment, for instance, the steps of blocks 52 and 54 may be performed between any of the users A-F and any others of the users A-F of FIG. 1. Or, the steps of blocks 52 and 54 may be performed on any of the links 14 between the bridge 12 and any of the users A-F (FIG. 1).

In methods of the invention, both loss and latency are measured dynamically. As used herein, the term "dynamically" is intended to be broadly interpreted as being substantially continuous and updated. More frequent measurements are preferred, except that too high of a frequency can add undesirable overhead. The frequency of measurements will depend on factors including the size and condition of the network, number of users, the application, and others. In typical videoconferences and virtual meeting applications, it has been discovered that dynamically measuring loss and latency in intervals of no more than every 0.5 sec offers beneficial results. Measuring at intervals of no more than about 0.1 sec may provide greater benefits.

In the exemplary method of FIG. 4, a decision is next made as to whether the latency or the loss exceeds a limit. (block 56). The limit may be a pre-set limit determined using factors such as communications application, network size and condition, and the like. By way of example, if an exemplary method of the invention is being practiced during an event in which real time audio and video are being communicated, a latency limit may be set at about 0.5 seconds, and a data loss limit at about 0.5%. Other limits may also be used. In other videoconference or virtual meeting applications, for instance, and absolute loss limit of 0 (e.g., any loss is unacceptable) may be beneficial, and a latency limit of 0.1 sec. Referring to the decision block 56 once again, if latency between the sender and receiver is less than 0.5 seconds and if data loss is less than 0.5%, a "no" decision will result (block 58), and steps of dynamically measuring latency and loss (blocks 52 and 54) will be repeated.

If it is determined, on the other hand, that data latency or loss exceeds the limits, a "yes" decision results (block 60). The exemplary method then includes a step of determining the actual reception rate of the receiver. (block 62). The actual reception rate may be expressed, for instance, in units of data packets received per unit time. The transmission rate of data being transmitted from the sender is then adjusted to not exceed the actual reception capacity. (block 64).

This may be accomplished, for instance, by intentionally dropping packets at the sender. In methods of the invention practiced in videoconference or other virtual meeting applications in which a video and audio data streams are being communicated, the video data stream often consumes a more substantial portion of available bandwidth than does audio. It has also been discovered that the overall quality of a user's participation experience generally favors fault-free audio over fault-free video. From a videoconference viewer perspective, it has been discovered that a choppy video signal is typically more acceptable than a choppy audio signal. Some methods of the invention exploit this discovery.

By way of illustration, if it is determined through a method of the invention that throttling of data transmission is required due to decreased bandwidth capacity and/or excessive consumption, video data packets will be dropped instead of audio data. Note that in some circumstances video may be more important than audio, and that under these circumstances the present invention contemplates dropping audio over video. Other circumstances may also make dropping of other forms of data more desirable. In some methods of the invention data streams can be assigned a priority, with the lowest priority dropped first upon a determination of high latency or loss.

In order for sacrificing video over audio to be most beneficial, networks should generally be audio friendly. If operating with TCP, this implies that the network be TCP-friendly. Conditions required for a network to be audio-friendly generally include: 1) very low packet loss, and 2) reasonably low latency on the data channel. Note that condition 2) is specified for a "data channel". As used herein, the terms "data channel" and "data ports" are intended to be broadly interpreted as the channel/ports over which underlying data is being communicated. That is, these are the channels/ports that the data which end users consume (e.g., video or audio data) travel, as opposed, for instance, to control data communicated across control ports/channels which is not ultimately consumed by end users but is instead utilized to manage communications.

Many proposed methods for estimating latency, including TCP-friendly algorithms, generally compute round trip time (RTT) to estimate latency over a control ("ctrl") channel based on the assumption that RTT on any channel or port is the same as on all other channel or ports. It has been discovered that this is not a reasonable assumption in many environments, with multi-point videoconferences being one example, as router buffering being a significant source of latency on stressed networks. It has been discovered that RTT can differ between channels—buffers do distinguish between different source ports. Relying only on ctrl channel RTT essentially ignores this data buffering. As a result, an exemplary method of the invention measures latency on the data channel.

When intentionally dropping packets within a method of the invention, it is desirable to account for the intentionally dropped packets to avoid causing an erroneous loss level being reported. Some embodiments of the invention do so by recording the sequence number of dropped packets, the total number of dropped packets, the time of dropping, and other information regarding intentionally dropped packets. Also, if a method of the invention is practiced on a network operating with a protocol that generates loss reports such as RTP/RTCP, those loss reports will not be relied upon to directly determining loss. If desired, the loss value from the report can be adjusted to account for intentionally dropped packets. In other exemplary methods, steps of examining the reported number of packets received and comparing that to the number of packets sent are performed, with the difference between the two being the actual number of packets lost.

Having now discussed an exemplary method of the invention as well as an environment for practicing it, exemplary method steps may be discussed in greater detail. Referring to FIG. 4 in addition to FIG. 1, an initial exemplary step is to measure data latency between a sender and a receiver. (FIG. 4, block 52). The sender and receiver may be, for example, the bridge 12 and the user A (FIG. 1). In this example, the data latency would represent the delay in sending data from the bridge 12 over the link 14 to the user A. This delay may result, for instance, from multiple routers that are encountered between the bridge 12 and the user A.

Note that the method of FIG. 4 may be practiced simultaneously at the user A (in addition to at the bridge 12), in which case the delay for data sent from user A to the bridge 12 may also be measured. Further, a method of the invention can be practiced wherein the sender is user A and the receiver the user F, in which case the latency will be determined over the links 14 between each of the respective users and the bridge 12.

Methods of the invention contemplate many different particular steps for determining this latency. In one exemplary method step, the sender's and receiver's system clocks are synchronized. Those knowledgeable in the art will appreciate that there are several known steps for synchronizing clocks. These steps, however, have not heretofore been adapted for practice in a method of the invention. FIG. 5 is useful to illustrate one particular set of steps for determining clock offset between the sender 70 and receiver 72 within a method of the invention practiced in an RTP environment. Note that in FIG. 5 the sender 70 system clock is not in agreement with the receiver 72 system clock. With reference to that FIG, a clock offset $\theta$ can be appreciated to be the difference between $t_1$ and $t_0$ less the latency between system 70 and system 72.

All active senders in an RTP session are required to periodically transmit an RTCP sender report (SR). This packet contains, among other things, the current system time of the sender 70 ($t_0$), the last SR timestamp received from each other source (lsr) (for example, when receiver 72 sends a report back to sender 70, lsr in that report will be $t_0$), and the delay since receiving the last SR from each of these sources (dlsr— for example, in the report sent from receiver 72 back to sender 70, dlsr will be ($t_2-t_1$)). Other protocols likewise utilize reports that include similar information. In methods of the invention, upon receiving one of these packets the receiver 72 records the packet's arrival time ($t_a$) ($t_a=t_1$ for the report sent from sender 70 to receiver 72, and $t_a=t_2$ for the report sent by receiver 72 to sender 70). The clock offset $\theta$ between the system clock at sender 70 and receiver 72 may then computed as the difference in the two timestamps minus a network latency factor:

$$\delta = (t_1 - lsr - dlsr) \quad \text{Equation 1}$$

$$\theta = t_0 - (t_1 + lsr + dlsr)/2 \quad \text{Equation 2}$$

Where:
 $\delta$ is round trip time
 $\theta$ is clock offset (i.e., difference between the two clocks)

Note that a symmetric connection is assumed, where the latency in both directions is the same. The possible error due to this assumption is:

$$\text{error} = +/- \delta/2$$

with the result that the smaller $\delta$, the smaller the possible error. Since a calculated value for $\theta$ is valid for a significant time (assuming both system clocks have low drift), it is preferred that these calculations are made only when network conditions are favorable. Favorable conditions generally include low and consistent latency. In particular, favorable conditions include low $\delta$, low and equal upstream and downstream network bit rates, low jitter (all of these can be computed from RTP packet headers), etc.

In methods of the invention practiced in a videoconference or virtual meeting environments, it has been discovered that these conditions often exist at the initiation of the conference or meeting when relatively little traffic is being communicated. Some methods of the invention include steps of synchronizing system clocks whenever network conditions are favorable, and then re-synchronizing anytime that network conditions are more favorable. For example, system clocks may be initially synchronized at the beginning of a videoconference, and then re-synchronized at any time during the conference when network conditions achieve more favorable conditions (e.g., lower round trip time). Once clocks have been synchronized, determining data latency between any of the users A-F and one another and/or the bridge is straightforward. Timestamps of received data packets may simply be compared to the system clock, and an adjustment made for clock offset $\theta$.

Other exemplary methods of the invention do not rely on synchronized clocks for determining data latency. These method steps may prove useful, for instance, when network conditions are not favorable for synchronizing system clocks. In one particular set of exemplary steps for estimating upstream data latency DL, a client system maintains a cache of system time values for when each data packet is transmitted. In methods of the invention practiced within an RTP/ TTCP RTP/RTCP environment, when an SR or RR report ("RPRT") is received the transmission time TT is retrieved for the packet whose sequence number matches the EHSR field ("Extended Highest Sequence Number Received") (mod $2^{16}$) of the appropriate reception report. It has been discovered that the difference between this and the system current time CT gives a very accurate, and perhaps an exact, value for upstream data latency DL plus downstream control latency CL:

$$DL + CL = (CT - TT_{EHSR}) \quad \text{Equation 3}$$

That is, this relationship accurately represents the time DL that the data took to traverse data ports between the sender and the receiver in addition to the time CL that the control data took to traverse the control ports from the receiver back to the sender.

It has also been discovered that it is reasonable to estimate the downstream ctrl latency CL as about one half the RTCP RTT, which may be readily determined using known methods, and may also be available from an RPRT $$CL = (RTCP\ RTT)/2 \quad \text{Equation 4}$$

Substituting Equation 3 into Equation 4, the data latency DL between the sender and receiver can be estimated as follows:

$$DL = (CT - TT_{EHSR}) - (RTCP\ RTT)/2 \quad \text{Equation 5}$$

Those knowledgeable in the art will appreciate that there are other method steps for estimating data latency which will be appropriate for use in practice of the invention, and which are contemplated for practice in methods of the invention.

Referring once again to FIG. 4, an exemplary method of the invention dynamically measures network loss in addition to latency. On packet based networks such as those operating under internet protocol, loss may be expressed in terms of packets of data that have been lost. Protocols such as RTP provide reports that may include loss data. Adapting such reported data to dynamically determine loss in applications such as videoconferences and virtual meetings, however, has heretofore not been accomplished with satisfactory results. One problem to overcome is that the loss reports are for a specific period of time in the past. Also, when comparing loss reports received at the bridge 12 from different of the users A-F (FIG. 1), the periods of time each individual report correspond to do not match up. For example, a report from user A may report lost packets for time period 1, while a report from user B may report lost packets for time period 2 that is different from timer period 1.

A further complication in exemplary methods of the invention is that when the network is saturated the method may include a step of intentionally dropping packets (e.g.; FIG. 5, block 64). These intentionally dropped packets should be accounted for in order to "correct" the loss reported by the RTP or other protocol loss detection/reporting function.

Exemplary methods of the invention solve these problems. In many exemplary methods, these problems may be overcome in part by storing information that includes one or more of the sequence number of packets received, the total number of packets received, and the time of transmission of each packet referenced by sequence number, and the reception time of each packet referenced by packet number. It has been discovered that this information can be manipulated to dynamically provide very accurate levels of loss. This information may be stored, for instance, in a cache at each of the users A-F and/or the bridge 12.

Referring to FIG. 1 by way of illustration, assume that methods of the invention are being practiced by the bridge 12 and the user A. In some configurations consistent with FIG. 1, the bridge 12 may function as a repeater that is transparent to the users A-F. The bridge 12 may interpret reports from each user A-F regarding each other user A-F. None of these reports actually pertain to the bridge/repeater 12 itself; the bridge/repeater 12 is essentially "invisible" to each source. As an illustration of a potential complication, consider a straight-forward loss calculation. User A reports loss AB from user B and AC from user C. The bridge 12 recorded loss BrC from user C and BrD from user D. The bridge 12 also recorded loss $Br_{INDUCED}$ due to intentionally dropping packets. One exemplary step for calculating loss from the bridge 12 to user A ($L_{BrA}$) includes determining:

$$L_{BrA}=[(AB-BrB)+(AC-BrC)]-Br_{INDUCED}$$

A problem with making this calculation is that AB and AC represent values from a different time interval than do BrB, BrC, and $Br_{INDUCED}$. As a result, the accuracy of the loss calculation increases as the (AB−BrB) value becomes more significant. Within exemplary methods of the invention, this is overcome by performing limited comparisons and only under selected conditions to minimize error and maximize accuracy. Generally, this is accomplished by assigning data packets sequence numbers (or otherwise utilizing existing data packet sequence numbers) and cross-referencing the sequence numbers to obtain corresponding data that corrects for time-shifting effects. One example calculation is:

$$L_{RI}=\Sigma(L_{JI}-L_{JBr})-L_{BrI,INTERNAL} \qquad \text{Equation 6}$$

Where:
$L_{RI}$=loss from the output of the repeater R (i.e., the bridge 12) to site I
$L_{JI}$=loss from site J to site I (as reported by site I)
$L_{JR}$=loss from site J to the repeater (as detected by the repeater).
$L_{RI,INTERNAL}$=Packets intentionally dropped to site I by the repeater.

The summation is taken over all sites J such that J≠I. Next, define:
$E_{XY}$=The number of packets site Y expected from site X
and insert it into Equation 6 as follows:

$$L_{RI} = \Sigma[L_{JI} - L_{JR} + (E_{JI} - E_{JI})] - L_{RI,INTERNAL} \qquad \text{Equation 7}$$

$$= [\Sigma(E_{JI} - L_{JR}) - L_{RI,INTERNAL}] - \Sigma(E_{JI} - L_{JI})$$

Then define
$S_{XY}$=The number of packets site X sent to site Y

Then (based on some assumptions about the repeater's design):

$$S_{RI}=\Sigma(E_{JI}-L_{JR})-L_{RI,INTERNAL} \qquad \text{Equation 8}$$

to finally arrive at:

$$L_{RI}=S_{RI}-\Sigma(E_{JI}-L_{JI}) \qquad \text{Equation 9}$$

The bridge 12 linking communications between all users directly measures $S_{RI}$, and $E_{JI}$ and $L_{JI}$ can be provided in reception reports from site I. Within RTP protocol, $E_{JI}$ can be computed from the "Extended Highest Sequence Number Received" (EHSR) field in the reports, which includes the last sequence number site I received from J at the time the report was generated. One of the assumptions underlying Equation 8 is that the repeater sends each packet at the same time as that packet is received, so if it is known when packet X from site Y was received, the time at which it was sent is known. In fact, the time of reception of packet X from site Y is available since a cache of this information is maintained. A time value can then be looked up based on the EHSR field, and used to look up $S_{RI}$ in another cache maintained for each host.

The result is an $S_{RI}$ value that represents data over the same interval used to compute $E_{JI}$, which in turn is the same interval site I used to compute $L_{JI}$. A similar technique using Equation 6 is possible, but may be impractical based on the large number of calculations required and because of issues of separating UDP from RTP level design. Also, it has been discovered that there is more flexibility in implementing Equation 9 (for example, accuracy can be traded for speed).

It is noted that Equation 6 involves values from J+1 different time intervals while Equation 9 only involves two different intervals. The summation in Equation 6 could be distributed to simplify it to only two intervals, but worst-case error would then increase while average-case error stays the same (and occurs in a way that makes compensating for it more complex.)

Those knowledgeable in the art will appreciate that there are a number of steps suitable for dynamically determining loss within methods of the invention. Alternative steps are contemplated. For example, an alternative step for computing loss is based on Equation 6, but utilizes $E_{XY}$ (The number of packets site Y expected from site X) in a different manner:

$$(L_{RI}/E_{RI})\cdot E_{RI}=\Sigma[(L_{JI}/E_{JI})\cdot E_{JI}-(L_{JR}/E_{JR})\cdot E_{JR}]-(L_{RI,INTERNAL}/E_{RI})\cdot E_{RI} \qquad \text{Equation 10}$$

Then define
$$1_{XY}:=(L_{XY}/E_{XY})$$

And introduce that into Equation 10:

$$1_{RI}\cdot E_{RI}=\Sigma[1_{JI}\cdot E_{JI}-1_{JR}\cdot E_{JR}]-1_{RI,INTERNAL}\cdot E_{RI} \qquad \text{Equation 11}$$

Note that the number of packets expected is the average packet transmission rate times the length of the time interval of interest:

$$E_{XY}=B_{XY}\cdot T$$

Where
$E_{XY}$=number of packets Y expects from X
$B_{XY}$=average rate at which X should send packets to Y if there was no loss
T=the length of the time interval of interest Introducing that definition into Equation 11 results in:

$$1_{RI}\cdot B_{RI}\cdot T=\Sigma[1_{JI}\cdot B_{JI}\cdot T-1_{JR}\cdot B_{JR}\cdot T]-(1_{RI,INTERNAL}\cdot B_{RI}\cdot T)$$

$$1_{RI}\cdot B_{RI}=\Sigma[1_{JI}\cdot B_{JI}-1_{JR}\cdot B_{JR}]-(1_{RI,INTERNAL}\cdot B_{RI})$$

$1_{RI} = \Sigma[1_{JI} \cdot B_{JI} - 1_{JR} \cdot B_{JR}]/B_{RI} - 1_{RI,INTERNAL}$  Equation 12

Study of which users are transmitting/receiving what discovers that:

$B_{JR} = B_{JI}$, and $B_{RI} = \Sigma(B_{JI})$ for all $J$ (except where $J=I$).

and $1_{RI} = \Sigma[(1_{JI} - 1_{JR}) \cdot B_{JI}]/\Sigma(B_{JI}) - 1_{RI,INTERNAL}$  Equation 13

$1_{JI}$ is explicitly given in RTCP reception reports from site I, and $B_{JI}$ can be calculated from the "Extended Highest Sequence Number Received" (EHSR) field from this packet, together with associated sender report timestamps (NTPTS):

$B_{JI} = (EHSR[i] - EHSR[i-1])/(NTPTS[i] - NTPTS[i-1])$

The repeater computes $1_{JR}$ for each source at a time interval equal to the mean interval it receives reports from the sites. It computes $1_{RI,INTERNAL}$ each time it receives a report from site I, prior to using this value in Equation 13. Finally $1_{RI}$ should be maintained as a running average; i.e., put through a low-pass filter:

$1_{RI}[i] = (1-A) \cdot \{\Sigma[(1_{JI} - 1_{JR}) \cdot B_{JI}]/\Sigma(B_{JI}) - 1_{RI,INTERNAL}\} + A \cdot 1_{RI}[i-1]$  Equation 14 where the filter coefficient A is directly proportional to the maximum error:

$A = K \cdot ERR_{MAX}$ $ERR_{MAX} = \{\Sigma(|T_{JI} - T_{JR}| \cdot B_{JI,MAX}) + (T_{RI,INTERNAL} - T_{JI}) \cdot \Sigma(B_{JI,MAX})\}/\Sigma(E_{JI})$  Equation 15

Where $T_{XY}$ is the length of the time interval over which $1_{XY}$ was computed. For $T_{JI}$, this is:

$T_{JI} = NTPTS[i] - NTPTS[i-1]$

As discussed above, $E_{JI}$ can be computed from the EHSR field in reception reports. Finally, because $B_{JI,MAX}$ is not conveniently measured directly, it can be estimated as:

$B_{JI,MAX} \approx C \cdot B_{JI}$ where C is some constant. Then $K_2 := C \cdot K$ $A \approx K_2 \cdot \{\Sigma(|T_{JI} - T_{JR}| \cdot B_{JI}) + (T_{RI,INTERNAL} - T_{JI}) \cdot \Sigma(B_{JI})\}/\Sigma(E_{JI})$  Equation 16

$K_2$ can be found experimentally, and may depend on how sensitive the method is desired to be verses how fast it is desired to respond to changes in loss.

In exemplary methods of the invention, the repeater maintains a cache of system time values for every packet received from each RTP source. Preferably, the cache is saved over a significant time period, but not one that is so long as to strain processing. Periods of about 5-10 sec, and most preferably near to 10 sec have been discovered to be beneficial. The size and performance of this cache can be implemented very reasonably on modern low-cost computers. The repeater maintains a similar cache of the total number of packets sent and the current system time for each remote host.

When an RTCP sender report is received, the repeater retrieves the system time associated with the packet with sequence number specified by the EHSR field in each reception report. The largest of these time values is used to lookup the total number of packets sent to the client. The difference between this variable and its previous value is the number of packets sent during the remote source's last report interval, taking into account network latency. This is then compared to the number of packets that the client actually received $\{\Sigma[(EHSR[I] - EHSR[I-1]) - (Lost[I] - Lost[I-1])]\}$ to obtain the exact link loss. An exemplary method of the invention then calculates upstream data latency as the difference between the largest time value found when computing loss and the SR's timestamp, synchronized to the local time.

Referring again to the flowchart of FIG. 4, after dynamically determining latency and loss, a method of the invention next decides whether the latency or loss exceeds a limit. (block 56). The limit may be a pre-set limit determined using factors such as communication application, network size and condition, and the like. By way of example, if an exemplary method of the invention is being practiced during an event in which real time audio and video are being communicated, a latency limit may be set at about 0.5 seconds, and a data loss limit at no more than about 0.5%. These limits have been discovered to provide useful results. As a result, if latency between the sender and receiver is less than 0.5 seconds and if data loss is less than 0.5%, a "no" decision will result (block 58), and steps of dynamically measuring latency and loss will be repeated.

If loss or latency exceeds these limits, then the exemplary method of FIG. 4 proceeds to determine the actual reception capacity of the receiver. (block 62). Referring to FIG. 1 for illustration, this step might be practiced by the bridge 12 determining the actual reception capacity of the user A upon determining that the loss or latency on the link 14 therebetween was unacceptable. If so, the current upstream reception rate (e.g., the reception rate for user A) using information available from packets such as RTCP packets, the exact reception rate of the remote source (modulo loss) can be computed using the relationship:

$RRU = [(EHSR_i - EHSR_{[i-1]}) - (LP_i - LP_{[i-1]})]/(TS_{[i]} - TS_{[i-1]})$  Equation 17 where:
RRU=Upstream reception rate (e.g., the number of packets per unit time received by the user A)
$EHSR_i$=The most recent Extended Highest Sequence Number Received field from the appropriate reception report within a sender report received from the recipient (e.g., from user A)
$EHSR_{[i-1]}$=The previous "Extended Highest Sequence Number Received" field from the appropriate reception report within a sender report received from the receiver (e.g., from user A)
$LP_i$=The most recent "Cumulative Number of Packets Lost" field from the appropriate reception report within a sender report received from the receiver (e.g., from user A)
$LP_{[i-1]}$=The PREVIOUS "Cumulative Number of Packets Lost" field from the appropriate reception report within a sender report received from the receiver (e.g., from user A)
$TS_i$=The timestamp of the sender report containing $EHSR_i$ and $LP_i$.
$TS_{i-1}$=The timestamp of the sender report containing $EHSR_{[i-1]}$ and $LP_{[i-1]}$.

Equation 17 therefore calculates the total actual number of packets received during the most recent time period between RTCP reports.

Those knowledgeable in the art will appreciate that many other steps for determining the actual reception rate of a receiver are possible and will be appropriate for practice in methods of the invention. The present invention contemplates use of such alternative steps.

Once the actual reception rate is known, the exemplary method of FIG. 4 proceeds to adjust the data transmission rate to not exceed this reception rate. (block 64). Exemplary methods of the invention accomplish this by intentionally dropping data packets. This may be referred to as throttling, in that the transmission rate is throttled back. This occurs at the transport level. In videoconference and other virtual meeting applications in which audio and video data is being communicated, exemplary methods include steps of dropping video over audio data. The video data stream often consumes a more substantial portion of available bandwidth than does audio. Also, it has been discovered that the overall quality of a user's participation experience generally favors fault-free audio over fault-free video. For example, it has been discovered that from a videoconference viewer perspective, a choppy video signal is typically more acceptable than a choppy audio signal.

In such applications, a method of the invention may drop as many video data packets as is necessary in order to achieve a data communication rate that does not exceed the receiver actual reception rate RRU. By way of illustration, if it is determined through a method of the invention that throttling of data transmission is required due to decreased bandwidth capacity and/or excessive consumption, video data packets may be dropped instead of audio data. Note that in some circumstances video may be more important than audio, and that under these circumstances the present invention contemplates dropping audio over video. Other circumstances may also make dropping of other forms of data more desirable.

Video data packets may be selected randomly for dropping from among all of the streams being communicated, or may be selected based on a prioritization. A particular data stream, for example, may be identified as a "low priority" data stream and be selected for dropping over other data streams. Referring to a videoconference application by way of further illustration, one speaker may be of special interest with one video and audio data stream associated with him designated as a high priority. Another data stream may be video showing an audience, and may be designated as a low priority. The low priority stream would be intentionally dropped upon network congestion instead of the high priority stream.

Other exemplary methods of the invention may reduce data transmission rate through steps other than intentionally dropping packets. For example, some exemplary methods may be practiced at the application level with a step of reducing data transmission rate including adjusting the video encoding parameters. This may be less advantageous than intentionally dropping packets in many applications, since it may require more substantial resources. If performed at the bridge 12, for example, adjusting encoding parameters may require re-encoding each stream, which is very expensive in terms of computer resources.

Two issues are noteworthy when considering steps of intentionally dropping packets:

1) A single remote host (e.g., an entity with a unique address/port pair) may contain multiple RTP sources and dropping packets per source instead of per host can be cumbersome. For example, a user A-F as illustrated in FIG. 2 is a single remote host but includes multiple devices that are streaming data (e.g., three cameras and two microphones).

2) The bridge or repeater may have to cross-reference feedback from multiple sources (e.g., each of the users A-F of FIG. 1), and these sources' feedback may not be sent over the same interval as all the others. This makes straightforward comparisons difficult to implement without substantially sacrificing accuracy and therefore reaction time.

Exemplary methods may address the first issue by computing values on a per-host instead of per-source basis. It has been discovered that it is beneficial to make decisions on forwarding/dropping packets using only RTP-level information. This can be difficult for reasons that include the possibility that multiple RTP sources share the same address/port. Within exemplary methods of the invention, this difficulty is overcome by acquiring UDP level information. Generally, per-source values are summed to a single a per-host value. Referring to FIG. 1 by way of illustration, user A will be treated as a single source instead of considering each of the three cameras and two microphones individually. Also, a cache is established that keeps track of the number of packets sent to a particular receiver without regard to which user they were received from or will be sent to.

The second issue can be addressed by reducing the number of functions requiring cross-referenced data and increasing the accuracy of those that do by maintaining substantial state information. For example, the bridge 12 or repeater may interpret reports from each user A-F regarding each other user A-F (FIG. 1). None of these reports actually pertain to the repeater itself; the repeater is essentially "invisible" to each source.

Some invention embodiments may include additional steps of increasing data communication after network congestion has abated. As discussed herein above, methods of the invention are useful to effectively reduce or throttle data communication when it is determined that a network link is congested (e.g., high latency or loss). When network congestion abates, it may be beneficial to increase data communication rates back to its previous level. Methods of the invention include steps that accomplish this.

Exemplary steps include storing the original data communication rate prior to decreasing it, and increasing the data communication rate (after having previously decreased it) by an amount INCR at specified time intervals INTRVL. INCR can be set as desired, and by way of example may be some portion of the decreased transmission rate or some portion of the current rate. For example, if network congestion was detected and the data communication rate was decreased by 10%, INCR may be, for example, one fifth of this or 2%. INTRVL may be, for example, 5 mins. Accordingly, the data communication rate would be increased by 2% every 5 mins until the original communication rate was reached. If unacceptable loss or latency is detected after increasing at one of the 2% intervals, the rate may be dropped again through steps as discussed above.

Other exemplary steps may include reducing INTRVL to quickly reach the original data transmission rate. For example, if the data communication rate is increased after $INTRVL_1$ by $INCR_1$ and acceptable levels of loss and latency are measured, then $INTRVL_2$ may be set smaller than $INTRVL_1$ (e.g., $INTRVL_2=(INTRVL_1/2)$), and/or $INCR_2$ may be set as larger than $INCR_1$ (e.g., $INCR_2=(2 \times INCR_1)$). If after increasing the data communication rate by $INCR_1$ it is determined that unacceptable levels of loss or latency occur, on the other hand, $INTRVL_2$ may be set larger than $INTRVL_1$ (e.g., $INTRVL_2=(2 \times INTRVL_1)$), and/or $INCR_2$ may be set as smaller than $INCR_1$ (e.g., $INCR_2=(INCR_1/2)$). Those knowledgeable in the art will appreciate that many other steps for increasing the rate back to the original rate are equivalent to the exemplary steps discussed, and are contemplated for practice with the present invention.

Methods, program products, and systems of the invention thereby provide many benefits and advantages over the prior art. For example, through practice of the invention loss for each direction on each link between multiple nodes and a repeater may be very accurately measured without modifying the stream. Latency may be determined on a "one-way" basis as opposed to on a "round-trip" basis, and may be determined across data channels as opposed to control channels. Still further, practice of the invention can calculate actual available bandwidth at a particular time across a link, allowing for most efficient use of the link.

Those skilled in the art will appreciate that the exemplary embodiments described and discussed herein are exemplary only, and that the invention is not limited to these embodiments. For example, although embodiments of the invention have been illustrated in the context of a virtual meeting or videoconference, it may be practiced in other real-time data stream sharing environments as well. By way of additional example, although embodiments have been illustrated with particular numbers of meeting attendees and data streams, it will be appreciated that the method of the invention may be practiced on any practical scale. Invention methods and program products may be practiced, for example, with virtual meetings that include tens, hundreds, or more conference rooms and/or attendees, and with real time data streams that far outnumber the one illustrated herein.

Also, it will be appreciated that although exemplary method and program products have been illustrated in a particular sequence of steps, the sequence is not necessarily important to the invention and could easily be altered. Those skilled in the art will also appreciate that a computer program product of the invention may be practiced using one computer, or may be practiced using a plurality of computers that are connected by a data network, with some method steps performed by a first computer and other steps performed by a second, connected computer. Likewise, reference has been made herein to particular variables that are employed in particular protocols, with EHSR being an example variable name in RTP. It will be appreciated that the present invention is not limited to practice in any particular protocol, and that the values associated with the variable discussed may be obtained when practicing the present invention when using other protocols.

Still further, some steps that have been discussed herein may be omitted and still be encompassed by the invention. For example, some methods of the invention may omit a step of determining the actual reception rate of the receiver upon a determination that the latency or loss is excessive, and may instead simply proceed to reduce the data transmission rate. The data transmission rate might be reduced, for instance, by some set limit (e.g., 20%), or could be slowly reduced in small steps (e.g., 5%) until latency and loss were determined to have reached acceptable limits.

Finally, it will be appreciated that methods of the present invention may find particular utility and benefit when practiced in the form of a computer program product. For purposes of best illustrating an exemplary method and computer program product of the invention, the following exemplary source code is provided illustrating one exemplary computer program product of the invention. The exemplary code is organized into the following Examples A-E, which together form one exemplary computer program product of the invention:

Example A—"RxCache.txt" contains exemplary computer code useful to save information (sequence number and receive time) for each packet received within the last few seconds (specified as max_data_cache_; 5 seconds is sufficient for many applications). GetPacketTime( ) then retrieves the time a packet with the given sequence number was received, as well as the time of the next received packet (or the current time if no further packets have been received). This function isn't used directly, but rather ReportTime( ) is used to find the largest time value(s) for the set of sequence numbers reported in a given RTCP RR or SR.

Example B—"TxCache.txt" contains code to save and retrieve the total number of packets transmitted to a client at a given time.

Both of these structures (Examples A and B) can be implemented as linked lists, but they can be made to be faster if used in conjunction with hash tables, or replaced with a statically-allocated vector with "head" and "tail" pointers. Using linked lists, though, is probably the simplest approach.

Example C—"ClockSync.txt": This exemplary computer code portion is where the clock synchronization takes place. RTCP reception reports are used to compute delta_. At the moment such a report is received, the maximum sync error is exactly delta_, so if delta_ is less than the maximum error in the previous sync value theta_, we recompute theta_ (otherwise it is generally left alone.) Sync error is proportional to the delta_ used to compute theta_ plus the time elapsed since the last sync times the relative clock drift. Typical relative clock drift values have been experimentally determined, and the value given in the code has been chosen as a relatively conservative value (much higher than it needs to be).

Example D—"ReceiveRate": The remote source's reception rate (packets/second) is computed from reports using the code given in, ReceiveRate.txt. This exemplary code illustrates one implementation of Equations discussed herein above. The Equations are repeated as comments where appropriate.

Example E—"Throttle.txt": Finally, this is all put together in Throttle.txt. The previous two RTCP reports from a given source are retrieved via FindTwoReports( ). From these reports we use ReportTime( ) and GetPacketCount( ) to find the number of packets transmitted between sending the last packet reported in each report. We take the difference between this and the value returned by Receive( ) (see ReceiveRate.txt) to compute the number of packets actually lost. At the same time upstream data latency is computed according to appropriation of the Equations herein.

Example A

"RxCache"

```
// Update state info based on a data packet received from this source
bool
Source::DataPacket(const void * packet size_t length, const ntp64_t & rxtime)
{
    const rtp_hdr_t * header = (const rtp_hdr_t *)packet;
    if (ntohl(header->ssrc) != ssrc_) {
        return false;            // packet does not pertain to invoking source
    }
    uint16_t seq = ntohs(header->seq); // sequence number
    uint32_t ts = ntohl(header->ts); // timestamp
    if (init_seq_) {
        // this is the first data packet we've received from this source
        // see RFC 3550 Appendix A.1 for more info on initialization
        InitSequenceNumber(seq);
        max_seq_ = seq - 1;
        probation_ = MIN_SEQUENTIAL;
```

-continued

```
    init_seq_ = false;
}
UpdateSequenceNumber(seq);
// Update interarrival jitter estimation
int clockrate = rtp_clockrate(rtp_type_t(header->pt));
if (clockrate != 0) {
    UpdateTransitTime(((uint64_t(rxtime) * clockrate) >> 32) – ts);
}
if (max_data_cache_ > 0) {
    // store this packet's sequence number and recv time
    record_t value;
    value.time = rxtime;
    value.seqno = seq;
    data_cache_.push_front(value);
    // limit the size of the data cache
    while (!data_cache_.empty() && (data_cache_.front().
time – data_cache_.back().time).integer > max_data_cache_) {
        data_cache_.pop_back();
    }
    last_recv_time_ = rxtime;
    return true;
}
// Set maximum seconds worth of data packet info we'll store for this
source
void
Source::SetDataCache(size_t seconds)
{
    max_data_cache_ = seconds;
    while (!data_cache_.empty() && (data_cache_.front().time –
data_cache_.back().time).integer > max_data_cache) {
        data_cache_.pop_back();
    }
}
// Retrieve the system time when the specified packet was received
bool
Source::GetPacketTime(uint16_t seqno, ntp64_t & time1, ntp64_t &
time2)
const
{
    if (data_cache_.empty())
        return false;
    //else if (int(data_cache_.front().seqno  –  seqno)  <=
int(seqno   – data_cache_.back().seqno)) {
        // do a forward search starting at the front of the cache
        datalist_t::const_iterator i;
        if ((i  =  find(data_cache_.begin(), data_cache_.end(),
seqno))  != data_cache_.end()) {
            time1 = i->time;
            time2 = (i == data_cache_.begin()) ? ntp64_time() : (--i)->time;
            return true;
        }
    //}
    // packet not found
    return false;
}
// Get the local time when we sent the last packet reported in "report"
bool
IGVideoBridge::ReportTime(const report_t & report, ntp64_t & report_
time, ntp64_t & max_report_time)
{
    // Lookup when we transmitted the last packet received by reporter
    ntp64_t result_time(0, 0), max_result_time(0, 0);
    std::vector<report_item_t>::const_iterator i;
    for (i = report.reports.begin(); i != report.reports.end(); ++i) {
    Source * reportee;
    if (FindSource(i->ssrc, reportee)) {
        ntp64_t time1, time2;
        if (reportee->GetPacketTime(i->ehsr, time1, time2)) {
            if (!result_time || int(time1 – result_time) > 0) {
                result_time = time1;
                max_result_time = time2;
            }
        }
    if (!result_time)
        return false;
    report_time = result_time
    max_report_time = max_result_time;
    return true;
}
```

Example B

"TxCache"

```
// Add the number of bytes sent and received
void
Client::DataBytesSent(size_t n)
{
(...)
    if (cache_size_ != 0) {
        // store the current time, octet count, and packet count
        record_t record;
        record.time = ntp64_time();
        record.osent = data_bytes_sent_;
        record.psent = data_packt_sent_;
        cache_.push_front(record);
        // limit the size of the cache
        while    (!cache_.empty()   &&    int((cache_.front().time –
cache_.back().time).integer) > int(cache_size_)) {
            cache_.pop_back();
        }
    }
(...)
    // maintain a running average of data packet size
    avg_pkt_size_ -= (int(avg_pkt_size_ – n) >> 4);
    data_bytes_sent_ += n;
    data_packt_sent_ += 1;
}
// Set the maximum data cache size (in seconds)
void
Client::SetCacheSize(size_t seconds)
{
    cache_size_ = seconds;
    while    (!cache_.empty()    &&    int((cache_.front().time –
cache_.back().time).integer) > int(cache_size_)) {
        cache_.pop_back();
    }
}
// Get the number of packets and octets sent at the given time
bool
Client::GetPacketCount(ntp64_t time, unsigned & psent, unsigned &
osent)
{
    if (cache_.empty()) {
        return false;
    }
    if (int64_t(uint64_t(time) – uint64_t(cache_.front().time)) > 0) {
        return false;
    }
    unsigned presult = 0, oresult = 0;
    for (cache_t::iterator i = cache_.begin(); i != cache_.end(); ++i) {
        if (int64_t(uint64_t(time) – uint64_t(i->time)) > 0) {
            psent = presult;
            osent = oresult;
            return true;
        }
        presult = i->psent;
        oresult = i->osent;
    }
    return false;
}
```

Example C

"ClockSync"

```
(...)
// update our round-trip time estimation
delta_ = ntp32_t(report.time) – i->lsr – i->dlsr;
// update our clock synchronization
if (report.sender && (!last_sync_time_ || delta_ <= SyncError())) {
```

```
    theta__ = uint64__t(report.ntp__ts) - uint64__t(report.time) -
        uint64__t(delta__) / 2;
    last__sync__delta__ = delta__;
    last__sync__time__ = report.time;
}
(...)
// Compute the current maximum error in clock synchronization
ntp64__t
Source::SyncError( ) const
{
    // error = +/- [delta + (drift * elapsed)]
    // Maximum relative drift -- we're using a very safe value
    const uint32__t drift = 429497; // expressed as a 32-bit fraction
    const uint32__t elapsed = ntp64__time( ) - last__sync__time__;
    uint32__t max__error = uint32__t(last__sync__delta__) +
        ((uint64__t(elapsed) * drift) >> 32);
    return max__error;
}
```

Example D

"ReceiveRate"

```
// Compute the time elapsed between the sending of two reports
bool
ReportInterval(const report__t & ri, const report__t & rj, ntp64__t & result)
{
    // report__interval[i,j] = ntp__ts[i] - ntp__ts[j]
    if (!ri.sender || !rj.sender)
        return false;
    else {
        result = ri.ntp__ts - rj.ntp__ts;
        return true;
    }
}
// Compute number of packets a source received between sending ri and rj.
```

```
bool
Received(const report__t & ri, const report__t & rj, int & result)
{
    // received[i,j] = Sum((ehsr[i] - ehsr[j]) - (total__lost[i] - total__
        lost[j]))
    if (ri.reports.size( ) != rj.reports.size( ))
        return false;
    const int nitems = ri.reports.size( ); // = rj.reports.size( );
    int received = 0;
    vector<report__item__t>::const__iterator pi = ri.reports.begin( );
    vector<report__item__t>::const__iterator pj = rj.reports.begin( );
    for (int item = 0; item < nitems; ++item, ++pi, ++pj) {
        if (pi->ssrc != pj->ssrc) return false;
        received += int(pi->ehsr - pj->ehsr) - int(pi->total__lost - pj->total__
            lost);
    }
    result = received;
    return true;
}
// Compute rate at which a source received packets between sending ri
and rj.
bool
ReceiveRate(const report__t & ri, const report__t & rj, int & result)
{
    // receive__rate[i,j] = received[i,j] / report__interval[i,j]
    int received; ntp64__t interval;
    if (!ReportInterval(ri, rj, interval) || !Received(ri, rj, received))
        return false;
    if (interval.integer == 0 && interval.fraction == 0)
        return false;
    else {
        result = (int64__t(received) << 32) / uint64__t(interval);
        return true;
    }
}
```

Example E

"Throttle"

```
...)
    if (client->IsThrottle( )) {
        // collect certain information if bandwidth throttling enabled
        client->SetCacheSize(5);
        const report__t * report__i, * report__j; // Retrieve the last two reports from this
source
        if (reporter->FindTwoReports(report__i, report__j)) {
            // when we received (~sent) last reported packet
            ntp64__t report__time, max__report__time;
            // Compute number of packets/octets sent
            if (!ReportTime(*report__j, report__time, max__report__time))
                return;
            unsigned psent__j = 0, osent__j = 0;
            if (!client->GetPacketCount(report__time, psent__j, osent__j))
                return;
            if (!ReportTime(*report__i, report__time, max__report__time))
                return;
            unsigned psent__i = 0, osent__i = 0;
            if (!client->GetPacketCount(report__time, psent__i, osent__i))
                return;
            // Compute data channel latency information
            ntp64__t latency, max__error;
            ntp64__t theta = reporter->SyncTheta( );
            ntp32__t delta = reporter->SyncDelta( );
            if (theta && report__i->sender) {
                // If clock sync is available, use that to estimate upstream data latency
                latency = (report__i->ntp__ts - theta) - max__report__time;
                max__error = reporter->SyncError( ) + (max__report__time - report__time);
            }
            else {
                // If no sync available, estimate based on the assumption ctrl latency ~
data latency
```

-continued

```
        latency = max_error = uint32_t(delta) / 2;
      }
      if (int(latency.integer) < 0) latency = 0u;
      // Compute number of packets received by remote source
      int received = 0;          // packets received by source
      if (!Received(*report_i, *report_j, received) || received == 0)
        return;
      int sent = int(psent_i – psent_j);        // packets sent
      int lost = max(sent – received, 0);       // packets lost
      int expected = sent + lost;               // packets expected
      uint8_t loss = (expected <= 0) ? 0 : ((lost << 8) / expected);
      int receive_rate = 0;      // Rate at which packets received by this
source
      if (!ReceiveRate(*report_i, *report_j, receive_rate))
        return;
      client->UpdateStats(loss, delta, latency, max_error, receive_rate);
    }
(...)
void
Client::UpdateStats(uint8_t  loss,  ntp32_t  rtt,  ntp64_t  latency,  ntp64_t
latency_error, int receive_rate)
{
  if (IsThrottle( )) {
    // Adjust bandwidth according to statistics
    const ntp32_t MAX_DATA_LATENCY(0, 1 << 15);     // 500 ms
    const ntp32_t MAX_CTRL_RTT(1, 0);               // 1000 ms
    const Timer::mtime_t MIN_PROBE_INTERVAL = 500;
    const Timer::mtime_t MAX_PROBE_INTERVAL = 300000;
    const uint8_t MAX_DATA_LOSS = 26;
    // Note latency and rtt are both instantaneous readings
    // so we look at the current AND previous reading to
    // avoid responding to a transient glitch.
    // We look at RTT in addition to latency in case we are
    // unable to get a good latency estimation (due to high RTT)
    bool saturated = false;
    if (latency_error < latency && latency_error_ < latency_) {
      saturated |= ((latency – latency_error) >= MAX_DATA_LATENCY) &&
((latency_ – latency_error_) >= MAX_DATA_LATENCY);
    }
    saturated |= (rtt >= MAX_CTRL_RTT) && (rtt_ >= MAX_CTRL_RTT);
    saturated |=  (loss  >=  MAX_DATA_LOSS)  &&  (loss_  >=
MAX_DATA_LOSS);
    unsigned receive_rate_kbps = (receive_rate * avg_pkt_size_) >> 7;
    if (saturated) {
      // connection saturated; set bandwidth to 90% current upstream receive rate
      SetBandwidth((receive_rate_kbps * 9)/10);
      probe_mark_ = receive_rate_kbps;
      probe_interval_ = min(probe_interval_ *  2, MAX_PROBE_INTERVAL);
      probe_timer_.Reset( );
      probe_timer_.Start( );
    }
    else if (probe_timer_.Time( ) >= probe_interval_) {
      // periodically try increasing bandwidth by 10% of last saturation point
      SetBandwidth(Bandwidth( ) + probe_mark_ /10);
      if (receive_rate_kbps >= (probe_mark_ * 11) / 10) {
        // if we're 10% above last saturation point, get more agressive
        probe_interval_      = max(probe_interval_       /       2,
MIN_PROBE_INTERVAL);
      }
      probe_timer_.Reset( );
    }
    // bound 80 kbps < bandwidth < max_bandwidth
    SetBandwidth(max(min(Bandwidth( ), MaxBandwidth( )), 80u));
    // bandwidth over 1 Gbps is considered unlimited
    if (Bandwidth( ) >= 1000000) SetBandwidth(INFINITE_BANDWIDTH);
  }
  // save statistics
  loss_ = loss;
  rtt_ = rtt;
  latency_ = latency;
  latency_error_ = latency_error;
  receive_rate_ = receive_rate;
}
```

What is claimed is:

1. A method for audio and video data control for communicating streaming video data over a data network including a plurality of computers operated by users and linked to one another by at least one conference bridge, a plurality of cameras for generating said video data and a plurality of microphones for generating said audio data, the network operating under a protocol that provides reports, the method comprising steps of:

receiving video data from each of said plurality of cameras and each of said plurality of microphones, communicating said video and audio data to others of said users and displaying said video data using displays, and playing said audio data using speakers;

dynamically measuring data packet loss between said bridge and each of said users for one or more of said audio or video data, said bridge recording information in a memory including a sequence number and a reception time for each data packet it receives from each of said plurality of users, said bridge determining a number of lost packets from each of said plurality of users over a substantially identical time period;

dynamically measuring data latency between said users for one or more of said audio or video data;

comparing said dynamically measured data packet loss to a loss limit and comparing said dynamically measured data latency to a latency limit;

determining a rate of data reception of said receiver if either of said loss limit or said latency limit is exceeded, said rate of data reception determined by:

$$RRU=[(EHSR_i-EHSR_{[i-1]})-(LP_i-LP_{[i-1]})]/(TS_{[i]}-TS_{[i-1]})$$

where:
 RRU=actual data reception rate (e.g., the number of packets per unit time received by said receiver)
 $EHSR_i$=The most recent packet sequence number received from said report received from said receiver
 $EHSR_{[i-1]}$=The previous packet sequence number received from said report received from said receiver
 $LP_i$=The most recent cumulative number of packets lost from said report received from the receiver
 $LP_{[i-1]}$=The previous cumulative number of packets lost from said report received from the receiver
 $TS_i$=The timestamp of the report containing $EHSR_i$ and $LP_i$.
 $TSi_{i-1}$=The timestamp of the report containing $EHSR_{[i-1]}$ and $LP_{[i-1]}$, and if one or both of said loss limit or said latency limit is exceeded, reducing the rate of data transmission from the sender for one or more of said audio or video data to not exceed said rate of data reception.

2. The audio and video data control system of claim 1 wherein said loss limit is 0.

3. The audio and video data control system of claim 1 wherein said latency limit is no more than about 0.1 seconds.

4. The audio and video data control system of claim 1 wherein the said packet based data is communicated using at least a data channel and a control channel, wherein time data is maintained by said sender that includes the time of transmission of each data packet, wherein reports are communicated from said receiver to said sender that include the highest sequence number of data packet received from said sender, and wherein the step of dynamically measuring said data latency time DL is determined according to the relationship:

$$DL=(CT-TT_{EHSR})-(RTCP\ RTT)/2$$

where
 CT=current system time;
 TT=time of transmission of each data packet
 EHSR=highest sequence number of data packet received from said sender
 $TT_{EHSR}$=transmission time TT of the highest sequence number packet reported received in said report;
 RTCP RTT=control channel round trip time between sender and receiver.

5. The audio and video data control system of 1 wherein the step of reducing said rate of data transmission includes intentionally dropping a portion data packets being transmitted from said sender.

6. The audio and video data control system of claim 5, wherein said data packets comprise real time streaming audio and real time streaming video, and wherein said portion of said data packets comprises only video data packets.

7. The audio and video data control system of claim 6, wherein said data packets comprise real time streaming audio and real time streaming video, and wherein said portion of said data packets comprises only audio data packets.

8. The audio and video data control system of claim 5, wherein said data packets comprise a plurality of real time streaming data streams, and further including the step of ranking at least a portion of said streams by priority and wherein the step of intentionally dropping a portion of said data packets comprises dropping packets only from the lowest priority of said data streams.

9. The audio and video data control system of claim 5, and wherein said data communications is made using a protocol that reports lost packets, and wherein the method further includes the step of accounting for said intentionally dropped packets.

10. The audio and video data control system of claim 5 wherein said data being communicated includes real time audio and video data being streamed between a plurality of users linked by a bridge, and wherein the step of intentionally dropping packets is performed at said bridge.

11. The audio and video data control system of claim 10 wherein each of said users includes a plurality of individual sources of streaming data, and wherein said bridge sums all of said sources at each of said users to a single user stream.

12. The audio and video data control system of claim 1 wherein the step of dynamically measuring data latency comprises measuring data loss at intervals of no more than about every 0.5 sec.

13. The audio and video data control system of claim 1 wherein said data communication includes real time audio and video data being streamed between a plurality of users on the network linked to one another by a repeater, and wherein the steps of the method are performed at said repeater and at each of said users whereby the step of reducing the rate of data transmission is carried out at said repeater to reduce the rate of transmission to any of said users and may be carried out at any of said users to reduce the rate of transmission to said repeater.

14. The audio and video data control system of claim 1 and further including the step of increasing said data communication rate after determining one or both of said data latency and data loss are at acceptable levels.

15. The audio and video data control system of claim 14 wherein the step of increasing said data communication rate includes increasing by an amount $INCR_1$ after a time interval $INTRVL_1$ wherein $INCR_1$ is some defined portion of said data communications rate.

16. The audio and video data control system of claim 15 and further including the step determining that one or both of said data loss and said data latency are acceptable after increasing said data communication rate by $INCR_1$, and one or both of setting $INCR_2$ larger than $INCR_1$ and setting $INTRVL_2$ smaller than $INTRVL_1$.

17. The audio and video data control system of claim 15 and further including the step determining that one or both of said data loss and said data latency are unacceptable after increasing said data communication rate by $INCR_1$, and one or both of setting $INCR_2$ smaller than $INCR_1$ and setting $INTRVL_2$ larger than $INTRVL_1$.

18. A videoconference computer program product comprising computer readable program instructions that are stored in a memory, the program product for use with a videoconference system, the program instructions when executed by one or more computers cause the one or more computers to perform a method for controlling real time audio and video data communications over the packet based network during a videoconference, wherein packet based audio and video data is communicated using at least a data channel and a control channel, wherein time data is maintained by a sender that includes the time of transmission of each data packet, wherein reports are communicated from a receiver to the sender that include the highest sequence number of data packet received from the sender, said method comprising the steps of:

dynamically measuring data packet loss between the receiver and the sender on the network;

dynamically measuring data latency time DL between said sender and receiver according to the relationship:

$$DL=(CT-TT_{EHSR})-(RTCP\ RTT)/2$$

where
CT=current system time;
TT=time of transmission of each data packet
EHSR=highest sequence number of data packet received from said sender
$TT_{EHSR}$=transmission time TT of the highest sequence number packet reported received in said report;
RTCP RTT=control channel round trip time between sender and receiver;

comparing said dynamically measured data packet loss to a loss limit and comparing said dynamically measured data latency to a latency limit; and, if one or both of said loss limit or said latency limit is exceeded, reducing the rate of data transmission from the sender.

19. The videoconference computer program product of claim 18 wherein said loss limit is no more than about 0.5% of data packets.

20. The videoconference computer program product of claim 18 wherein each of said sender and said receiver have a system clock, and wherein the step of dynamically determining data latency includes the step of synchronizing said sender system clock with said receiver system clock.

21. The videoconference computer program product of claim 20 wherein said data communication comprises real time audio and video data being streamed from a plurality of users over the network participating in a videoconference, and wherein the step of synchronizing said system clocks occurs substantially at the start of the videoconference.

22. The videoconference computer program product of claim 20 wherein the step of synchronizing said system clocks is repeated whenever the network has conditions favorable to performing a synchronization.

23. The videoconference computer program product of claim 18 wherein the step of dynamically measuring data latency comprises measuring data loss at intervals of no more than about every 0.1 sec.

24. The videoconference computer program product of claim 18 wherein said data communication includes real time audio and video data being streamed between a plurality of users on the network linked to one another by a bridge, wherein the step of dynamically measuring data loss is performed between said bridge and each of said users and further includes the step of said bridge storing information including a sequence number and a reception time for each data packet it receives from each of said plurality of users.

25. The videoconference computer program product of claim 24 and further including the step of said bridge storing information including the total number of packets received from each of said plurality of users.

26. The videoconference computer program product of claim 24 and further including the step of said bridge determining a number of lost packets from each of said plurality of users over a substantially identical time period.

27. The videoconference computer program product of claim 24 wherein said information is stored for a series of data packets received over an interval of between about 5 and about 10 sec.

28. The videoconference computer program product of claim 18 wherein said data is being communicated between a plurality of users linked to one another by a repeater R, and wherein the step of dynamically measuring data loss includes determining:

$$L_{RI}=S_{RI}-\Sigma(E_{JI}-L_{JI})$$

Where:
$L_{RI}$=loss from the output of the repeater to user I taken over all users J such that J≠I,
$S_{RI}$=The number of packets repeater R sent to user I,
$E_{JI}$=The number of packets user J expected from user I,
$L_{JI}$=loss from user J to user I (as reported by user I), and
$\Sigma(E_{JI}-L_{JI})$ is taken over all J and I.

29. A videoconference computer program product, comprising computer readable program instructions that are stored in a memory, the program product for use with a videoconference system, the program instructions when executed by one or more computers cause the one or more computers to perform a method for controlling real time data communications over a packet based network being communicated between a plurality of users linked to one another by a repeater R during a videoconference, said method comprising the steps of:

dynamically measuring data packet loss between a receiver and a sender on the network by determining:

$$L_{RI}=S_{RI}-\Sigma(E_{JI}-L_{JI})$$

where:
$L_{RI}$=loss from the output of the repeater to user I taken over all users J such that J≠I,
$S_{RI}$=The number of packets repeater R sent to user I,
$E_{JI}$=The number of packets user J expected from user I,
$L_{JI}$=loss from user J to user I (as reported by user I), and
$\Sigma(E_{JI}-L_{JI})$ is taken over all J and I;

dynamically measuring data latency between said sender and receiver;

comparing said dynamically measured data packet loss to a loss limit and comparing said dynamically measured data latency to a latency limit; and, if one or both of said loss limit or said latency limit is exceeded, reducing the rate of data transmission from the sender.

30. The videoconference computer program product of claim 29 wherein said latency limit is no more than about 0.5 seconds.

31. The videoconference computer program product of claim 29, wherein said data packets comprise real time streaming audio and real time streaming video data packets being communicated between each of a plurality of participants in a real time videoconference being conducted over said network, wherein said sender is a bridge linking said plurality of users to one another, and wherein said receiver is any of said participants.

32. The videoconference computer program product of claim 29 wherein the said packet based data is communicated using at least a data channel and a control channel, and wherein the step of dynamically determining data latency between said sender and said receiver is done over said data channel.

33. The videoconference computer program product of claim 29 wherein the step of reducing said data transmission rate is performed at the application level.

34. A method for communicating streaming video data over a data network comprising the steps of:

linking a plurality of user computers to one another over a packet based network by at least one conference bridge; and linking a plurality of cameras to each of the user computers for generating video data, the plurality of user computers communicating real time streaming audio and video data to one another over said bridge;

dynamically measuring data packet loss between a receiver and a sender on the network, said data being communicated between a plurality of users linked to one another by a repeater R, where the dynamic measurement of data loss comprises determining:

$$L_{RI} = S_{RI} - \Sigma(E_{JI} - L_{JI})$$

where:

$L_{RI}$=loss from the output of the repeater to user I taken over all users J such that J≠I, $S_{RI}$=the number of packets repeater R sent to user I, $E_{JI}$=the number of packets user J expected from user I, $L_{JI}$=loss from user J to user I (as reported by user I), and $\Sigma(E_{JI} - L_{JI})$ is taken over all J and I;

dynamically measuring data latency between said sender and receiver; comparing said dynamically measured data packet loss to a loss limit and comparing said dynamically measured data latency to a latency limit;

if one or both of said loss limit or said latency limit is exceeded, reducing the rate of data transmission from the sender and increasing said data communication rate after determining one or both of said data latency and data loss are at acceptable levels, and wherein said data communication rate is increased by an amount $INCR_1$ after a time interval wherein $INCR_1$ is some defined portion of said data communications rate.

\* \* \* \* \*